United States Patent
Fu et al.

(10) Patent No.: US 10,244,521 B2
(45) Date of Patent: Mar. 26, 2019

(54) METHOD AND UE FOR TRANSMITTING HARQ-ACK

(71) Applicant: Samsung Electronics Co., Ltd, Gyeonggi-do (KR)

(72) Inventors: Jingxing Fu, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 15/128,098

(22) PCT Filed: Mar. 20, 2015

(86) PCT No.: PCT/KR2015/002752
§ 371 (c)(1),
(2) Date: Sep. 21, 2016

(87) PCT Pub. No.: WO2015/142115
PCT Pub. Date: Sep. 24, 2015

(65) Prior Publication Data
US 2017/0105198 A1 Apr. 13, 2017

(30) Foreign Application Priority Data

Mar. 21, 2014 (CN) .......................... 2014 1 0117446
Jun. 23, 2014 (CN) .......................... 2014 1 0283017
Aug. 26, 2014 (CN) .......................... 2014 1 0424974

(51) Int. Cl.
*H04W 72/04* (2009.01)
*H04L 1/18* (2006.01)
*H04L 5/00* (2006.01)

(52) U.S. Cl.
CPC .......... *H04W 72/042* (2013.01); *H04L 1/1822* (2013.01); *H04L 1/1854* (2013.01); *H04L 5/00* (2013.01); *H04L 5/0055* (2013.01)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS 8,958,383 B2 * 2/2015 Fu .......................... H04B 7/0404
370/329
9,386,565 B2 * 7/2016 Yang ..................... H04L 1/1861
(Continued)

FOREIGN PATENT DOCUMENTS

WO WO 2013/165145 A1 11/2013

OTHER PUBLICATIONS

3GPP TSG RAN WG Meeting #76, R1-140335, Agenda Item 7.2.8.1.3 (LG Electronics), Feb. 1-14, 2014.*
(Continued)

*Primary Examiner* — Gbemileke J Onamuti
*Assistant Examiner* — Sanjay K Dewan

(57) ABSTRACT

The provided is a method for transmitting HARQ-ACK in a LTE system, which is applicable to a situation that an uplink subframe is occupied in an FDD or TDD system. The method is implemented as follows. A UE receives information from an eNB, and determines the assignment of uplink subframes in a cell. The UE determines the transmission of HARQ-ACK according to the assignment of uplink subframes in the cell. By the provided method, the transmission of HARQ-ACK of PDSCH is less influenced when an uplink subframe in the FDD or TDD system is occupied.

19 Claims, 2 Drawing Sheets a UE receives information from an eNB, and determines the assignment of uplink subframes in a cell — 101 the UE determines the transmission of HARQ-ACK according to the assignment of uplink subframes in the cell — 102

(56) References Cited

U.S. PATENT DOCUMENTS

| | | | | |
|---|---|---|---|---|
| 9,686,064 | B2* | 6/2017 | He | H04L 1/1861 |
| 2012/0307779 | A1* | 12/2012 | Noh | H04B 7/155 |
| | | | | 370/329 |
| 2013/0322413 | A1* | 12/2013 | Pelletier | H04W 72/1289 |
| | | | | 370/336 |
| 2014/0003302 | A1* | 1/2014 | Han | H04W 28/08 |
| | | | | 370/280 |
| 2014/0003375 | A1* | 1/2014 | Nam | H04W 72/0406 |
| | | | | 370/329 |
| 2014/0185495 | A1* | 7/2014 | Kuchibhotla | H04W 76/023 |
| | | | | 370/281 |
| 2014/0233481 | A1* | 8/2014 | Feng | H04L 5/0055 |
| | | | | 370/329 |
| 2014/0269338 | A1* | 9/2014 | Jung | H04L 5/0055 |
| | | | | 370/241 |
| 2014/0269539 | A1* | 9/2014 | Yin | H04L 5/0092 |
| | | | | 370/329 |
| 2014/0301324 | A1* | 10/2014 | Cheng | H04L 1/1861 |
| | | | | 370/329 |
| 2014/0369290 | A1* | 12/2014 | Yang | H04L 1/1861 |
| | | | | 370/329 |
| 2015/0078224 | A1* | 3/2015 | Xiong | H04L 1/1887 |
| | | | | 370/280 |
| 2015/0092689 | A1* | 4/2015 | Ko | H04L 1/1861 |
| | | | | 370/329 |
| 2015/0156762 | A1* | 6/2015 | Hwang | H04L 1/1671 |
| | | | | 370/311 |
| 2015/0223230 | A1* | 8/2015 | Liang | H04L 5/0055 |
| | | | | 370/329 |
| 2016/0028511 | A1* | 1/2016 | Papasakellariou | H04W 72/0406 |
| | | | | 370/329 |
| 2016/0309461 | A1* | 10/2016 | Yin | H04W 52/22 |
| 2016/0381674 | A1* | 12/2016 | Kim | H04B 7/26 |
| | | | | 370/329 |
| 2017/0034785 | A1* | 2/2017 | Suzuki | H04W 52/08 |
| 2017/0230843 | A1* | 8/2017 | Ouchi | H04W 16/32 |
| 2017/0230917 | A1* | 8/2017 | Ouchi | H04W 16/32 |

OTHER PUBLICATIONS

3GPP TSG RAN WG1 Meeting #76, R1-140491, Agenda Item : 7.2.8.1.3 (NEC), Feb. 10-14, 2014.*
International Search Report dated Jun. 10, 2015 in connection with International Application No. PCT/KR2015/002752, 4 pages.
Written Opinion of the International Searching Authority dated Jun. 10, 2015 in connection with International Application No. PCT/KR2015/002752, 7 pages.
NEC, "Discussion on Multiplexing D2D Link and Cellular Link", 3GPP TSG RAN WG1 Meeting #76, R1-140491, Prague, Czech Republic, Feb. 10-14, 2014, 2 pages.
LG Electronics, "Multiplexing of Uu and D2D Communication", 3GPP TSG RAN WG1 Meeting #76, R1-140335, Prague, Czech Republic, Feb. 10-14, 2014, 7 pages.
Catt, "Multiplexing Between Cellular Link and D2D Link", 3GPP TSG RAN WG1 Meeting #75, R1-135093, San Francisco, CA, Nov. 11-15, 2013, 3 pages.

* cited by examiner

[Fig. 1]
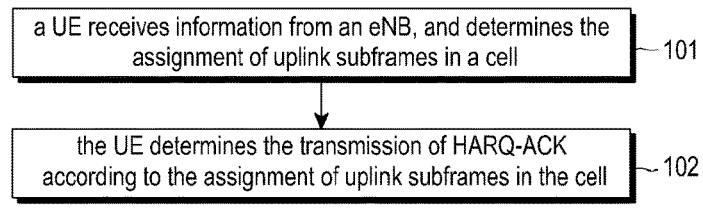
[Fig. 2]
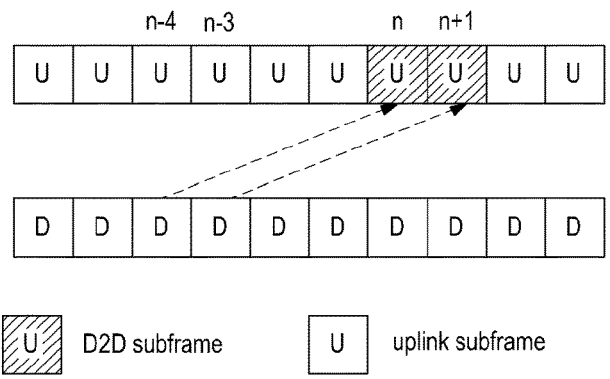
[Fig. 3]
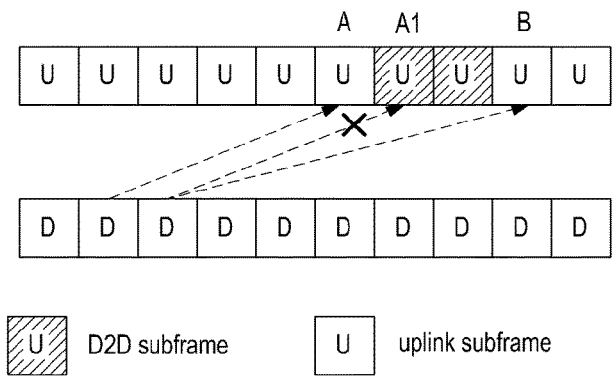
[Fig. 4]
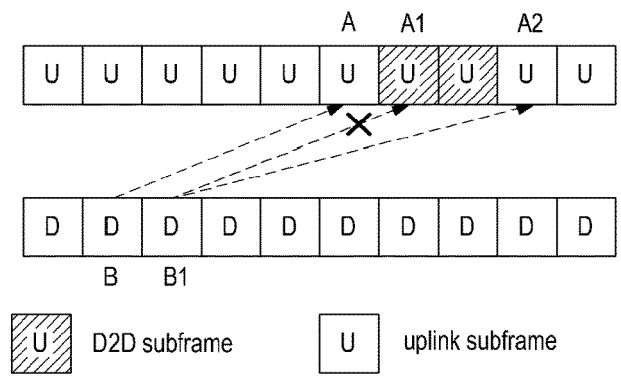

[Fig. 5]
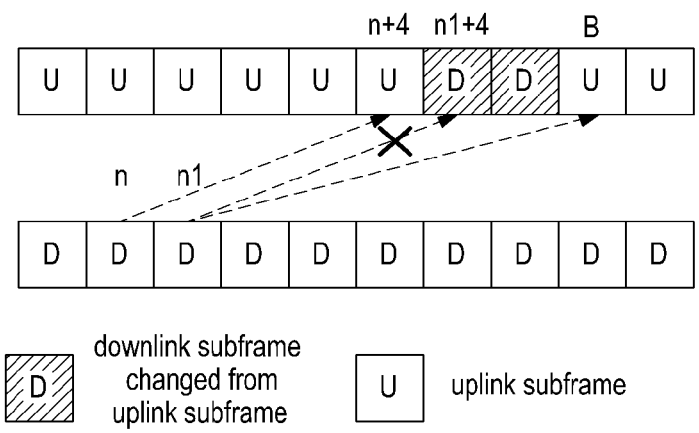
[Fig. 6]
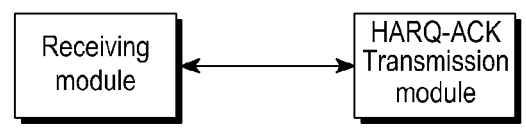

US 10,244,521 B2

METHOD AND UE FOR TRANSMITTING HARQ-ACK

CROSS-REFERENCE TO RELATED APPLICATIONS AND CLAIM OF PRIORITY

The present application claims priority under 35 U.S.C. § 365 to International Patent Application No. PCT/KR2015/002752 filed Mar. 20, 2015, entitled "METHOD AND UE FOR TRANSMITTING HARQ-ACK", and, through International Patent Application No. PCT/KR2015/002752, to Chinese Patent Application No. 201410117446.2 filed Mar. 21, 2014, Chinese Patent Application No. 201410283017.2 filed Jun. 23, 2014, and Chinese Patent Application No. 201410424974 filed Aug. 26, 2014, each of which are incorporated herein by reference into the present disclosure as if fully set forth herein.

TECHNICAL FIELD

The present disclosure relates to mobile communication technologies, and more particularly to a method and User Equipment (UE) for transmitting Hybrid Automatic Repeat reQuest-Acknowledge (HARQ-ACK) in a Long Term Evolution (LTE) system.

BACKGROUND ART

In a LTE system, a UE is always connected to a cellular network, and transmits or receives a Device-to-Device (D2D) signal or channel.

D2D communication under a LTE cell occupies uplink resources, i.e., Frequency Division Duplexing (FDD) uplink carriers or Time Division Duplexing (TDD) uplink subframes. Communication channels or signals of the cellular network may include a Physical Uplink Shared Channel (PUSCH), a Physical Uplink Control Channel (PUCCH), a Physical Random Access Channel (PRACH) and a Sounding Reference Signal (SRS). D2D channels or signals may include a Synchronization Signal (SS), a Discovery Signal (DS), a Control Channel (CCH) and a Data Channel (DCH). A D2D SS may include one or more of a Primary D2D SS (PD2DSS), a Secondary D2D SS (SD2DSS) and a Physical D2D Synchronization Channel (PD2DSCH). A D2D DS may include a D2D DS sequence and a D2D DS message.

A D2D UE may have different service requirements, for example, a service requirement for Public Safety (PS) or a service requirement for Non-public Safety (N-PS). Different service requirements have different importance.

It is on the same uplink subframe that a UE is to transmit or receive a D2D channel or signal and transmit a cellular channel or signal. The UE is unable to transmit both a D2D channel or signal and a cellular channel or signal at the same time in a cell through a Frequency Division Multiplexing (FDM) mode. However, on a D2D subframe, the D2D channel or signal needs to be transmitted or received, and HARQ-ACK generated by a Physical Downlink Shared Channel (PDSCH) on a downlink subframe corresponding to the uplink subframe also needs to be transmitted.

DISCLOSURE OF INVENTION

Technical Problem

This situation was not described before. How both the D2D channel or signal and the cellular channel or signal are transmitted on the same subframe is a to-be-solved problem.

Solution to Problem

The object of the present disclosure is to solve at least one of the above problems. Embodiments of the present disclosure provide a method and UE for transmitting HARQ-ACK in a LTE system, so as to solve the transmission problem of the HARQ-ACK when an uplink subframe in an FDD or TDD system is occupied. For example, the uplink subframe in the FDD or TDD system is occupied by a D2D channel or signal or occupied by a downlink subframe.

An embodiment of the present disclosure provides a method for transmitting HARQ-ACK in a LTE system, which comprises:

A) receiving, by a User Equipment (UE), information from an evolved Node B (eNB), and determining the assignment of uplink subframes in a cell; and B) determining, by the UE, the transmission of HARQ-ACK according to the assignment of uplink subframes in the cell.

The assignment of uplink subframes comprises the assignment of subframes of a Frequency Division Duplexing (FDD) uplink carrier that are configured as Device-to-Device (D2D) subframes and the assignment of Time Division Duplexing (TDD) uplink subframes that are configured as D2D subframes.

The process B) comprises:

for a subframe n of the FDD uplink carrier that is configured as a D2D subframe or a TDD uplink subframe n that is configured as a D2D subframe, according to FDD or TDD timing, when the UE is to transmit HARQ-ACKs of downlink subframes $m_0, m_1 \ldots m_{M-1}$ on the subframe n and the UE receives a Physical Downlink Shared Channel (PDSCH) indicated by a Physical Downlink Control Channel (PDCCH) or an enhanced PDCCH (ePDCCH) on any one of the downlink subframes $m_0, m_1 \ldots m_{M-1}$, or receives a PDSCH not indicated by the PDCCH or the ePDCCH, or receives a PDCCH or an ePDCCH indicating Semi-Persistent Scheduling (SPS) release, stopping, by the UE, transmitting and receiving a D2D channel or signal on the D2D subframe, and transmitting, by the UE, the HARQ-ACKs on the D2D subframe; and when the UE does not receive the PDSCH indicated by the PDCCH or the ePDCCH on any one of the downlink subframes $m_0, m_1 \ldots m_{M-1}$, does not receive the PDSCH not indicated by the PDCCH or the ePDCCH, and does not receive the PDCCH or the ePDCCH indicating SPS release, transmitting or receiving, by the UE, the D2D channel or signal on the D2D subframe.

The process B) comprises:

for a subframe n of the FDD uplink carrier that is configured as a D2D subframe or a TDD uplink subframe n that is configured as a D2D subframe, according to FDD or TDD timing, when the UE is to transmit HARQ-ACKs of downlink subframes $m_0, m_1 \ldots m_{M-1}$ on the subframe n and the UE receives a PDSCH indicated by a PDCCH or an ePDCCH on any one of the downlink subframes $m_0, m_1 \ldots m_{M-1}$, or receives a PDSCH not indicated by the PDCCH or the ePDCCH, or receives a PDCCH or an ePDCCH indicating SPS release, deciding, by the UE according to a result obtained through comparing a priority of a Physical Uplink Control Channel (PUCCH) for transmitting the HARQ-ACKs with a priority of a D2D channel or signal, to transmit the PUCCH on the D2D subframe or to transmit or receive the D2D channel or signal on the D2D subframe; and when the UE does not receive the PDSCH indicated by the PDCCH or the ePDCCH on any one of the downlink subframes $m_0, m_1 \ldots m_{M-1}$, does not receive the PDSCH not indicated by the PDCCH or the ePDCCH, and does not receive the PDCCH or the ePDCCH indicating SPS release, transmitting or receiving, by the UE, the D2D channel or signal on the D2D subframe.

The UE decides, according to table, to transmit the PUCCH on the D2D subframe or to transmit or receive the D2D channel or signal on the D2D subframe;

TABLE

|  | SS | DS | PS CCH | PS DCH | N-PS CCH | N-PS DCH |
|---|---|---|---|---|---|---|
| PUCCH | 1,2 | 1,2 | 1,2 | 1,2 | 1 | 1 |

"1" in table denotes transmitting the PUCCH and stopping transmitting or receiving the D2D channel or signal;

"2" in table denotes stopping transmitting the PUCCH, and transmitting or receiving the D2D channel or signal; and "1,2" in table denotes a method denoted by "1" or a method denoted by "2".

The process B) comprises:

The process B) comprises:

when an uplink subframe for transmitting HARQ-ACK of a downlink subframe is not configured as a D2D subframe, transmitting the HARQ-ACK of the downlink subframe on the uplink subframe according to FDD or TDD timing; and when the uplink subframe for transmitting the HARQ-ACK of the downlink subframe is configured as the D2D subframe, not transmitting the HARQ-ACK of the downlink subframe on the uplink subframe, and transmitting the HARQ-ACK of the downlink subframe according to new HARQ-ACK timing; the new HARQ-ACK timing comprises transmitting the HARQ-ACK of the downlink subframe on an uplink subframe following the uplink subframe, wherein the uplink subframe following the uplink subframe is the first uplink subframe that is not configured as a D2D subframe.

For an FDD serving cell in which a D2D subframe is configured, when the new HARQ-ACK timing is adopted, the method further comprises:

when downlink subframes $m_0, m_1 \ldots m_{M-1}$ are to transmit HARQ-ACKs according to the new HARQ-ACK timing, blind detecting, by the UE, a PDCCH or an ePDCCH scrambled by a Cell-Radio Network Temporary Identifier (C-RNTI) of the UE in a UE specific search space on the PDCCH or the ePDCCH in the downlink subframes $m_0, m_1 \ldots m_{M-1}$, and not blind detecting the PDCCH scrambled by the C-RNTI of the UE in a common search space on the PDCCH in the downlink subframes $m_0, m_1 \ldots m_{M-1}$; a Downlink Control Information (DCI) format of the PDCCH or the ePDCCH is a modification format, and DCI in the modification format comprises a Downlink (DL) Downlink Assign Indication (DAI) field and a HARQ process number field of 4 bits.

For an FDD serving cell in which a D2D subframe is configured, the method further comprises:

when the uplink subframe for transmitting the HARQ-ACK of the downlink subframe is not configured as the D2D subframe, blind detecting, by the UE, a PDCCH or an ePDCCH scrambled by a C-RNTI of the UE in a UE specific search space on the PDCCH or the ePDCCH in the downlink subframe; a DCI format of the PDCCH or the ePDCCH is a modification format, and DCI in the modification format comprises a DL DAI field of 2 bits and a HARQ process number field of 4 bits; blind detecting, by the UE, the PDCCH scrambled by the C-RNTI of the UE in a common search space on the PDCCH in the downlink subframe; the DCI format of the PDCCH is an FDD format, and DCI in the FDD format does not comprise a DL DAI field and comprises a HARQ process number field of 3 bits; and when the uplink subframe for transmitting the HARQ-ACK of the downlink subframe is configured as the D2D subframe, transmitting the HARQ-ACK of the downlink subframe on an uplink subframe following the uplink subframe, wherein the uplink subframe following the uplink subframe is the first uplink subframe that is not configured as a D2D subframe, and blind detecting, by the UE, the PDCCH or the ePDCCH scrambled by the C-RNTI of the UE in the UE specific search space on the PDCCH or the ePDCCH in the downlink subframe; the DCI format of the PDCCH or the ePDCCH is a modification format, and DCI in the modification format comprises a DL DAI field of 2 bits and a HARQ process number field of 4 bits; not blind detecting, by the UE, a PDSCH scheduled by the PDCCH scrambled by the C-RNTI of the UE in the common search space on the PDCCH in the downlink subframe.

For an FDD serving cell in which a D2D subframe is configured, the method further comprises:

when HARQ-ACKs of downlink subframes $m_0, m_1 \ldots m_{M-1}$ are transmitted on an uplink subframe n and the bundling window size M of the uplink subframe n is equal to 1, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$; a DCI format of the PDCCH or the ePDCCH is a modification format, and DCI in the modification format comprises a DL DAI field of 2 bits, into which zero is filled, and comprises a HARQ process number field of 4 bits; blind detecting, by the UE, the PDCCH scrambled by the C-RNTI of the UE in a common search space on the PDCCH in the downlink subframes $m_0, m_1 \ldots m_{M-1}$; the DCI format of the PDCCH is an FDD format, and DCI in the FDD format does not comprise a DL DAI field and comprises a HARQ process number field of 3 bits; and when the HARQ-ACKs of the downlink subframes $m_0, m_1 \ldots m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$; the DCI format of the PDCCH or the ePDCCH is a modification format, and DCI in the modification format comprises a DL DAI field of 2 bits and a HARQ process number field of 4 bits; not blind detecting, by the UE, a PDSCH scheduled by the PDCCH scrambled by the C-RNTI of the UE in the common search space on the PDCCH in the downlink subframes $m_0, m_1 \ldots m_{M-1}$.

For an FDD serving cell in which a D2D subframe is configured, the method further comprises:

when HARQ-ACKs of downlink subframes $m_0, m_1 \ldots m_{M-1}$, are transmitted on an uplink subframe n and the bundling window size M of the uplink subframe n is equal to 1, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$; a DCI format of the PDCCH or the ePDCCH is an FDD format, and DCI in the FDD format does not comprise a DL DAI field of 2 bits and comprises a HARQ process number field of 3 bits; or, the DCI format of the PDCCH or the ePDCCH is a new format, and DCI in the new format does not comprise a DL DAI field of 2 bits and comprises a HARQ process number field of 4 bits; or, the DCI format of the PDCCH or the ePDCCH is a new format, and DCI in the new format comprises a DL DAI field of 2 bits and a HARQ process number field of 4 bits; blind detecting, by the UE, the PDCCH scrambled by the C-RNTI of the UE in a common search space on the PDCCH in the downlink subframes $m_0, m_1 \ldots m_{M-1}$; the DCI format of the PDCCH is an FDD format, and DCI in the FDD format does not comprise a DL DAI filed and comprises a HARQ process number field of 3 bits; and when the HARQ-ACKs of the downlink subframes $m_0, m_1 \ldots m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$; the DCI format of the PDCCH or the ePDCCH is a modification format, and the DCI in the modification format comprises a DL DAI field of 2 bits and a HARQ process number field of 4 bits; not blind detecting, by the UE, a PDSCH scheduled by the PDCCH scrambled by the C-RNTI of the UE in the common search space on the PDCCH in the downlink subframes $m_0, m_1 \ldots m_{M-1}$.

For an FDD serving cell in which a D2D subframe is configured, the method further comprises:

when HARQ-ACKs of downlink subframes $m_0, m_1 \ldots m_{M-1}$ are transmitted on an uplink subframe n and the bundling window size M of the uplink subframe n is equal to 1, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$; a DCI format of the PDCCH or the ePDCCH is an FDD format, and DCI in the FDD format does not comprise a DL DAI field of 2 bits and comprises a HARQ process number field of 3 bits; or, the DCI format of the PDCCH or the ePDCCH is a new format, and DCI in the new format does not comprise a DL DAI field of 2 bits and comprises a HARQ process number field of 4 bits; or, the DCI format of the PDCCH or the ePDCCH is a new format, and DCI in the new format comprises a DL DAI field of 2 bits and a HARQ process number field of 4 bits;

when the HARQ-ACKs of the downlink subframes $m_0, m_1 \ldots m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$; the DCI format of the PDCCH or the ePDCCH is a modification format, and the DCI in the modification format comprises a DL DAI field of 2 bits and a HARQ process number field of 4 bits;

when the uplink subframe for transmitting the HARQ-ACK of the downlink subframe is not configured as the D2D subframe, blind detecting, by the UE, the PDCCH scrambled by the C-RNTI of the UE in a common search space on the PDCCH in the downlink subframe; the DCI format of the PDCCH is an FDD format, and DCI in the FDD format does not comprise a DL DAI field and comprises a HARQ process number field of 3 bits; and when the uplink subframe for transmitting the HARQ-ACK of the downlink subframe is configured as the D2D subframe, not blind detecting, by the UE, the PDSCH scheduled by the PDCCH scrambled by the C-RNTI of the UE in the common search space on the PDCCH in the downlink subframe.

For an FDD serving cell in which a D2D subframe is configured, when new HARQ-ACK timing is adopted, the method further comprises:

when downlink subframes $m_0, m_1 \ldots m_{M-1}$ are to transmit HARQ-ACKs according to the new HARQ-ACK timing, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$; a DCI format of the PDCCH or the ePDCCH is a modification format, and DCI in the modification format comprises a DL DAI field and a HARQ process number field of 4 bits; blind detecting, by the UE, a PDCCH scrambled by the C-RNTI of the UE in a common search space on the PDCCH in the downlink subframes $m_0, m_1 \ldots m_{M-1}$; the DCI format of the PDCCH is an FDD format, and DCI in the FDD format does not comprises a DL DAI field and comprises a HARQ process number field of 3 bits.

The method further comprises:

for a PUCCH for transmitting the HARQ-ACK, wherein an uplink subframe where the PUCCH is located is configured as a D2D subframe, and for a PUCCH for transmitting the HARQ-ACK, wherein an uplink subframe where the PUCCH is located is not configured as a D2D subframe, performing power control according to different power control parameters.

The assignment of uplink subframes comprises: the assignment of subframes of the FDD uplink carrier that are changed into downlink subframes or D2D subframes.

The process B) comprises:

for an FDD serving cell, according to FDD HARQ-ACK timing or reference downlink HARQ-ACK timing configured through high layer signaling, when an uplink subframe n+4 for transmitting HARQ-ACK of a downlink subframe n of the downlink carrier is not changed into a downlink subframe or a D2D subframe, transmitting the HARQ-ACK of the downlink subframe n of the downlink carrier on the uplink subframe n+4; when the uplink subframe n+4 for transmitting the HARQ-ACK of the downlink subframe n of the downlink carrier is changed into the downlink subframe, transmitting the HARQ-ACK of the downlink subframe n of the downlink carrier according to new HARQ-ACK timing; the new HARQ-ACK timing comprises transmitting the HARQ-ACK of the downlink subframe n of the downlink carrier on an uplink subframe following the uplink subframe n+4, wherein the uplink subframe following the uplink subframe n+4 is the first uplink subframe that is not changed into a downlink subframe or a D2D subframe; or, configuring reference downlink HARQ-ACK timing through high layer signaling, wherein the reference downlink HARQ-ACK timing comprises any one of TDD uplink and downlink configurations 0, 1, 2, 3, 4, 5, 6.

The method further comprises:

when an uplink subframe for transmitting HARQ-ACK of a downlink subframe of the downlink carrier is not changed into a downlink subframe or a D2D subframe, blind detecting, by the UE, a PDCCH or an ePDCCH scrambled by a C-RNTI of the UE in a UE specific search space on the PDCCH or the ePDCCH in the downlink subframe of the downlink carrier; a DCI format of the PDCCH or the ePDCCH is a modification format, and DCI in the modification format comprises a DL DAI field of 2 bits and a HARQ process number field of 4 bits; or, the DCI format of the PDCCH or the ePDCCH is an FDD format, and DCI in the FDD format does not comprise a DL DAI field and comprises a HARQ process number field of 3 bits; blind detecting, by the UE, the PDCCH scrambled by the C-RNTI of the UE in a common search space on the PDCCH in the downlink subframe of the downlink carrier; the DCI format of the PDCCH is an FDD format, and DCI in the FDD format does not comprises a DL DAI field and comprises a HARQ process number field of 3 bits;

when the uplink subframe for transmitting the HARQ-ACK of the downlink subframe of the downlink carrier is changed into the downlink subframe or the D2D subframe, blind detecting, by the UE, the PDCCH or the ePDCCH scrambled by the C-RNTI of the UE in the UE specific search space on the PDCCH or the ePDCCH in the downlink subframe of the downlink carrier; the DCI format of the PDCCH or the ePDCCH is a modification format, and DCI in the modification format comprises a DL DAI field of 2 bits and a HARQ process number field of 4 bits; not blind detecting, by the UE, a PDSCH scheduled by the PDCCH scrambled by the C-RNTI of the UE in the common search space on the PDCCH in the downlink subframe of the downlink carrier; and in a HARQ-ACK bundling window, when the UE detects a PDCCH or an ePDCCH only in the UE specific search space on the PDCCH or the ePDCCH, transmitting, by the UE, the HARQ-ACK according to a TDD HARQ-ACK transmission mode; in the HARQ-ACK bundling window, when the UE detects the PDCCH in the common search space on the PDCCH, transmitting, by the UE according to an FDD HARQ-ACK transmission mode, HARQ-ACK of a PDSCH scheduled by the PDCCH detected in the common search space on the PDCCH.

The method further comprises:

when HARQ-ACKs of downlink subframes $m_0, m_1 \ldots m_{M-1}$ of the downlink carrier are transmitted in a bundling window and the bundling window size M of the bundling window is equal to 1, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$ of the downlink carrier; a DCI format of the PDCCH or the ePDCCH is a modification format, and DCI in the modification format comprises a DL DAI field of 2 bits and a HARQ process number field of 4 bits; or, the DCI format of the PDCCH or the ePDCCH is an FDD format, and DCI in the FDD format does not comprise a DL DAI field and comprises a HARQ process number field of 3 bits; blind detecting, by the UE, the PDCCH scrambled by the C-RNTI of the UE in a common search space on the PDCCH in the downlink subframes $m_0, m_1 \ldots m_{M-1}$ of the downlink carrier; the DCI format of the PDCCH is an FDD format, and DCI in the FDD format does not comprise a DL DAI field and comprises a HARQ process number field of 3 bits; and when the HARQ-ACKs of the downlink subframes $m_0, m_1 \ldots m_{M-1}$ of the downlink carrier are transmitted in the bundling window and the bundling window size M of the bundling window is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier; the DCI format of the PDCCH or the ePDCCH is a modification format, and DCI in the modification format comprises a DL DAI field of 2 bits and a HARQ process number field of 4 bits; not blind detecting, by the UE, a PDSCH scheduled by the PDCCH scrambled by the C-RNTI of the UE in the common search space on the PDCCH in the downlink subframes $m_0, m_1 \ldots m_{M-1}$ of the downlink carrier.

The method further comprises:

blind detecting, by the UE, a PDSCH scheduled by a PDCCH scrambled by a C-RNTI of the UE in a common search space on the PDCCH in a downlink subframe n of the downlink carrier; and not blind detecting, by the UE, the PDSCH scheduled by the PDCCH scrambled by the C-RNTI of the UE in a common search space on the PDCCH in a downlink subframe for transmitting the HARQ-ACK according to new HARQ-ACK timing;

when HARQ-ACKs of downlink subframes $m_0, m_1 \ldots m_{M-1}$ of the downlink carrier are transmitted in a bundling window and the bundling window size M of the bundling window is equal to 1, blind detecting, by the UE, the PDCCH or the ePDCCH scrambled by the C-RNTI of the UE in a UE specific search space on the PDCCH or the ePDCCH in the downlink subframes $m_0, m_1 \ldots m_{M-1}$ of the downlink carrier; the DCI format of the PDCCH or the ePDCCH is an FDD format, and DCI in the FDD format does not comprise a DL DAI field and comprises a HARQ process number field of 3 bits; blind detecting, by the UE, the PDCCH scrambled by the C-RNTI of the UE in the common search space on the PDCCH in the downlink subframes $m_0, m_1 \ldots m_{M-1}$ of the downlink carrier; the DCI format of the PDCCH is an FDD format, and DCI in the FDD format does not comprise a DL DAI field and comprises a HARQ process number field of 3 bits;

when the HARQ-ACKs of the downlink subframes $m_0, m_1 \ldots m_{M-1}$ of the downlink carrier are transmitted in the bundling window and the bundling window size M of the bundling window is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier; the DCI format of the PDCCH or the ePDCCH is a TDD format, and DCI in the TDD format comprises a DL DAI field of 2 bits and a HARQ process number field of 4 bits; and in a HARQ-ACK bundling window, when the UE detects a PDCCH or an ePDCCH only in the UE specific search space on the PDCCH or the ePDCCH, transmitting, by the UE, the HARQ-ACK according to a TDD HARQ-ACK transmission mode; in the HARQ-ACK bundling window, when the UE detects the PDCCH in the common search space on the PDCCH, transmitting, by the UE according to an FDD HARQ-ACK transmission mode, HARQ-ACK of a PDSCH scheduled by the PDCCH detected in the common search space on the PDCCH.

The transmitting the HARQ-ACK comprises:

when the UE configures a PUCCH format 3 HARQ-ACK transmission mode, arranging bits of HARQ-ACKs of downlink subframes in the same bundling window of each serving cell according to a sequence subframes;

when the UE configures a serving cell, supporting a TDD HARQ-ACK multiplexing transmission mode and the PUCCH format 3 HARQ-ACK transmission mode, and not supporting a TDD HARQ-ACK bundling transmission mode; and when the UE configures more than one serving cell, supporting the PUCCH format 3 HARQ-ACK transmission mode, and not supporting a PUCCH format 1b HARQ-ACK transmission mode with channel selection.

An embodiment of the present disclosure also provides a UE for transmitting HARQ-ACK in a LTE system, which comprises a receiving module and a Hybrid Automatic Repeat reQuest-Acknowledge (HARQ-ACK) transmission module;

the receiving module is configured to receive information from an evolved Node B (eNB), and determine the assignment of uplink subframes in a cell; and the HARQ-ACK transmission module is configured to determine the transmission of HARQ-ACK according to the assignment of uplink subframes in the cell.

As can be seen from the above solution, by the method and UE for transmitting the HARQ-ACK in the LTE system, it can be ensured that the transmission of the HARQ-ACK of the PDSCH is not influenced when the uplink subframe in the FDD or TDD system is occupied.

BRIEF DESCRIPTION OF DRAWINGS

FIG. 1 is a flowchart illustrating a method for transmitting HARQ-ACK according to an embodiment of the present disclosure.

FIG. 2 is a diagram illustrating a D2D subframe according to an embodiment of the present disclosure.

FIG. 3 is a diagram illustrating HARQ-ACK timing in which a D2D subframe is configured according to an embodiment of the present disclosure.

FIG. 4 is a diagram illustrating a D2D subframe according to another embodiment of the present disclosure.

FIG. 5 is a diagram illustrating HARQ-ACK timing in which an uplink subframe is changed into a downlink subframe according to an embodiment of the present disclosure.

FIG. 6 is a diagram illustrating the structure of a UE according to an embodiment of the present disclosure.

MODE FOR THE INVENTION

In order to make the object, technical solution and merits of the present disclosure clearer, the present disclosure will be illustrated hereinafter with reference to the accompanying drawings and embodiments.

An embodiment of the present disclosure provides a method and UE for transmitting HARQ-ACK in a LTE system. As shown in FIG. 1, the method includes following blocks.

At block 101, a UE receives information from an eNB, and determines the assignment of uplink subframes in a cell.

The assignment of uplink subframes may indicate that the location of uplink subframes for information communication except the uplink transmission between the UE and the eNB. For example, the uplink subframes for the information communication except the uplink transmission between the UE and the eNB may be some subframes of an FDD uplink carrier, which are configured as D2D subframes, or may be TDD uplink subframes configured as D2D subframes, or may be some subframes of the FDD uplink carrier, which are changed into downlink subframes.

At block 102, the UE determines the transmission of HARQ-ACK according to the assignment of uplink subframes in the cell.

The method for transmitting HARQ-ACK will be described hereinafter according to different assignments of uplink subframes.

A first embodiment is described hereinafter.

When a part of uplink subframes in an FDD or TDD serving cell configured by the UE are configured as D2D subframes, there are following several HARQ-ACK transmission methods.

A first method for transmitting HARQ-ACK is described as follows.

For an uplink subframe n configured as a D2D subframe in the FDD or TDD serving cell, according to FDD or TDD timing, when the UE is to transmit HARQ-ACKs of downlink subframes $m_0, m_1 \ldots m_{M-1}$ on the subframe n and the UE receives a PDSCH indicated by a PDCCH or an ePDCCH on any one of the downlink subframes $m_0, m_1 \ldots m_{M-1}$, or receives a PDSCH not indicated by the PDCCH or the ePDCCH, or receives a PDCCH or an ePDCCH indicating SPS release, the UE stops transmitting and receiving any D2D channel or signal on the D2D subframe and transmits the HARQ-ACKs on the D2D subframe. "M" is the number of downlink subframes for transmitting the HARQ-ACK on the same uplink subframe, called bundling window size.

When the UE does not receive the PDSCH indicated by the PDCCH or the PDCCH on any one of the downlink subframes $m_0, m_1 \ldots m_{M-1}$, does not receive the PDSCH not indicated by the PDCCH or the ePDCCH, and does not receive the PDCCH or the ePDCCH indicating SPS release, the UE may transmit and receive a D2D channel or signal on the D2D subframe.

In this way, it can be ensured that the HARQ-ACK transmission of the PDSCH in a cellular network is not influenced by the configuration of the D2D subframe, so as to further ensure that the throughput of downlink data in the cellular network is not influenced.

For example, for an FDD serving cell, the HARQ-ACK of a downlink subframe n−4 is to be transmitted on an uplink subframe n, and the uplink subframe n is a D2D subframe configured by the UE. When the UE receives a PDSCH indicated by a PDCCH on the downlink subframe n−4, according to HARQ-ACK timing of the PDSCH, the UE transmits the HARQ-ACK on the uplink subframe n and does not transmit and receive any D2D channel or signal on the uplink subframe n. The HARQ-ACK of a downlink subframe n−3 is to be transmitted on an uplink subframe n+1, and the uplink subframe n+1 is a D2D subframe configured by the UE. When the UE does not receive a PDSCH indicated by a PDCCH or an ePDCCH on the downlink subframe n−3, does not receive a PDSCH not indicated by the PDCCH or the ePDCCH, and does not receive a PDCCH or an ePDCCH indicating SPS release, the UE may transmit and receive a D2D channel or signal on the uplink subframe n+1, as shown in FIG. 2.

A second method for transmitting HARQ-ACK is described as follows.

For the uplink subframe n configured as the D2D subframe in the FDD or TDD serving cell, according to FDD or TDD HARQ-ACK timing, the UE needs to transmit the HARQ-ACKs of the downlink subframes $m_0, m_1 \ldots m_{M-1}$ on the subframe n. When the UE does not receive the PDSCH indicated by the PDCCH or the ePDCCH on any one of the downlink subframes $m_0, m_1 \ldots m_{M-1}$, does not receive the PDSCH not indicated by the PDCCH or the ePDCCH and does not receive the PDCCH or the ePDCCH indicating SPS release, the UE may transmit and receive the D2D channel or signal on the D2D subframe.

When the UE receives the PDSCH indicated by the PDCCH or the ePDCCH on any one of the downlink subframes $m_0, m_1 \ldots m_{M-1}$, or receives the PDSCH not indicated by the PDCCH or the ePDCCH, or receives the PDCCH or the ePDCCH indicating SPS release, the UE decides, according to a result obtained through comparing a priority of a PUCCH for transmitting the HARQ-ACKs with a priority of a D2D channel or signal, to transmit the PUCCH or to transmit or receive the D2D channel or signal.

A method for determining to transmit the PUCCH or to transmit or receive the D2D channel or signal is shown in table.

TABLE

| | SS | DS | PS CCH | PS DCH | N-PS CCH | N-PS DCH |
|---|---|---|---|---|---|---|
| PUCCH | 1,2 | 1,2 | 1,2 | 1,2 | 1 | 1 |

"1" in table denotes transmitting the PUCCH and stopping transmitting or receiving the D2D channel or signal;

"2" in table denotes stopping transmitting the PUCCH, and transmitting or receiving the D2D channel or signal; and "1,2" in table denotes a method denoted by "1" or a method denoted by "2".

In this way, services can be transmitted according to the priority of the HARQ-ACK of downlink data in the cellular network and the priority of the D2D channel or signal, so as to ensure that a service with a higher priority is transmitted preferentially.

For example, for an FDD serving cell, the HARQ-ACK of the downlink subframe n−4 is to be transmitted on the uplink subframe n, and the uplink subframe n is a D2D subframe configured by the UE. When the UE receives the PDSCH indicated by the PDCCH on the downlink subframe n−4, according to the HARQ-ACK timing of the PDSCH, the UE needs to transmit the HARQ-ACK on the uplink subframe n and also needs to transmit a D2D synchronous signal on the uplink subframe n. When the priority of the D2D synchronous signal is higher than the priority of the PUCCH, the UE stops transmitting the PUCCH, and transmits the D2D synchronous signal.

A third method for transmitting HARQ-ACK is described as follows.

For an FDD or TDD serving cell, according to the FDD or TDD HARQ-ACK timing, if an uplink subframe A for transmitting the HARQ-ACK of a downlink subframe is not configured as a D2D subframe, the HARQ-ACK of the downlink subframe is transmitted on the uplink subframe. According to the FDD or TDD HARQ-ACK timing, if an uplink subframe A1 for transmitting the HARQ-ACK of the downlink subframe is configured as a D2D subframe, the HARQ-ACK of the downlink subframe is not transmitted on the uplink subframe A1, and new HARQ-ACK timing is adopted. For example, the HARQ-ACK of the downlink subframe is transmitted on an uplink subframe B following the uplink subframe A1, wherein the uplink subframe B is the first uplink subframe that is not configured as the D2D subframe, as shown in FIG. 3.

For the FDD or TDD serving cell, according to the new HARQ-ACK timing, the number of downlink subframes for transmitting the HARQ-ACK on the same uplink subframe is called bundling window size of HARQ-ACK.

For the FDD serving cell and the TDD serving cell, a method for determining a DCI format and a method for transmitting HARQ-ACK are described respectively.

For the FDD serving cell, there are following processing methods for determining the DCI format.

A first processing method is described as follows.

For an FDD serving cell in which a D2D subframe is configured, when the downlink subframes $m_0, m_1 \ldots m_{M-1}$ are to transmit HARQ-ACKs according to the new HARQ-ACK timing, the UE blind detects a PDCCH or an ePDCCH scrambled by a C-RNTI of the UE only in a UE specific search space on the PDCCH or the ePDCCH in the downlink subframes $m_0, m_1 \ldots m_{M-1}$, and does not blind detect the PDCCH scrambled by the C-RNTI of the UE in a common search space on the PDCCH in the downlink subframes $m_0, m_1 \ldots m_{M-1}$. The DCI format of the PDCCH or the ePDCCH is a modification format, that is, the DCI in the modification format includes a DL DAI field and a HARQ process number field of 4 bits.

A second processing method is described as follows.

For an FDD serving cell in which a D2D subframe is configured, according to FDD HARQ-ACK timing, when the HARQ-ACK of a downlink subframe B is to be transmitted on an uplink subframe A and the uplink subframe A is not configured as a D2D subframe, the UE blind detects the PDCCH or the ePDCCH scrambled by the C-RNTI of the UE in a UE specific search space on the PDCCH or the ePDCCH in the downlink subframe B. The DCI format of the PDCCH or the ePDCCH is a modification format, that is, the DCI in the modification format includes a DL DAI field of 2 bits and a HARQ process number field of 4 bits. The UE blind detects the PDCCH scrambled by the C-RNTI of the UE in a common search space on the PDCCH in the downlink subframe B. The DCI format of the PDCCH is a modification FDD format, that is, the DCI in the FDD format does not include a DL DAI field and comprises a HARQ process number field of 3 bits, as shown in FIG. 4.

For an FDD serving cell in which a D2D subframe is configured, according to FDD HARQ-ACK timing, when the HARQ-ACK of a downlink subframe B1 is to be transmitted on an uplink subframe A1, and the uplink subframe A1 is configured as a D2D subframe, the HARQ-ACK of the downlink subframe B1 is transmitted on an uplink subframe A2 following the uplink subframe A1, wherein the uplink subframe A2 is the first uplink subframe that is not configured as a D2D subframe, and the UE blind detects the PDCCH or the ePDCCH scrambled by the C-RNTI of the UE in a UE specific search space on the PDCCH or the ePDCCH in the downlink subframe B1. The DCI format of the PDCCH or the ePDCCH is a modification format, that is, the DCI in the modification format includes a DL DAI field of 2 bits and a HARQ process number field of 4 bits. The UE does not blind detect a PDSCH scheduled by the PDCCH scrambled by the C-RNTI of the UE in a common search space on the PDCCH in the downlink subframe B1, as shown in FIG. 4.

A third processing method is described as follows.

For an FDD serving cell in which a D2D subframe is configured, according to FDD HARQ-ACK timing, when the HARQ-ACK of the downlink subframe B is to be transmitted on the uplink subframe A and the uplink subframe A is not configured as the D2D subframe, the HARQ-ACK of the downlink subframe B is transmitted on the uplink subframe A. According to the FDD HARQ-ACK timing, when the HARQ-ACK of the downlink subframe B1 is to be transmitted on the uplink subframe A1 and the uplink subframe A1 is configured as the D2D subframe, the HARQ-ACK of the downlink subframe B1 is transmitted on an uplink subframe A2 following the uplink subframe A1, wherein the uplink subframe A2 is the first uplink subframe that is not configured as the D2D subframe.

According to the above HARQ-ACK timing, the HARQ-ACKs of the downlink subframes $m_0, m_1 \ldots m_{M-1}$, are transmitted on the uplink subframe n and the bundling window size M is equal to 1, the UE blind detects the PDCCH or the ePDCCH scrambled by the C-RNTI of the UE in the UE specific search space on the PDCCH or the ePDCCH in the downlink subframes $m_0, m_1 \ldots m_{M-1}$. The DCI format of the PDCCH or the ePDCCH is a modification format, that is, the DCI in the modification format includes a DL DAI field of 2 bits, in which zero is filled, and a HARQ process number field of 4 bits. The UE blind detects the PDCCH scrambled by the C-RNTI of the UE in the common search space on the PDCCH in the downlink subframes $m_0$, $m_1 \ldots m_{M-1}$. The DCI format of the PDCCH is an FDD format, that is, the DCI in the FDD format does not include a DL DAI field and includes a HARQ process number field of 3 bits.

According to the above HARQ-ACK timing, when the HARQ-ACKs of the downlink subframes $m_0$, $m_1 \ldots m_{M-1}$ are transmitted on the uplink subframe n and the bundling window size M is larger than 1, the UE blind detects the PDCCH or the ePDCCH scrambled by the C-RNTI of the UE in the UE specific search space on the PDCCH or the ePDCCH in the downlink subframes $m_0$, $m_1 \ldots m_{M-1}$. The DCI format of the PDCCH or the ePDCCH is a modification format, that is, the DCI in the modification format includes a DL DAI field of 2 bits and a HARQ process number field of 4 bits. The UE does not blind detect the PDCCH scrambled by the C-RNTI of the UE in the common search space on the PDCCH in the downlink subframes $m_0$, $m_1 \ldots m_{M-1}$.

A fourth processing method is described as follows.

For an FDD serving cell in which a D2D subframe is configured, according to FDD HARQ-ACK timing, when the HARQ-ACK of the downlink subframe B is to be transmitted on the uplink subframe A and the uplink subframe A is not configured as the D2D subframe, the HARQ-ACK of the downlink subframe B is transmitted on the uplink subframe A. According to the FDD HARQ-ACK timing, when the HARQ-ACK of the downlink subframe B1 is to be transmitted on the uplink subframe A1 and the uplink subframe A1 is configured as the D2D subframe, the HARQ-ACK of the downlink subframe B1 is transmitted on an uplink subframe A2 following the uplink subframe A1, wherein the uplink subframe A2 is the first uplink subframe that is not configured as the D2D subframe.

According to the above HARQ-ACK timing, the HARQ-ACKs of the downlink subframes $m_0$, $m_1 \ldots m_{M-1}$, are transmitted on the uplink subframe n and the bundling window size M is equal to 1, the UE blind detects the PDCCH or the ePDCCH scrambled by the C-RNTI of the UE in the UE specific search space on the PDCCH or the ePDCCH in the downlink subframes $m_0$, $m_1 \ldots m_{M-1}$. The DCI format of the PDCCH or the ePDCCH is an FDD format, that is, the DCI in the FDD format does not include a DL DAI field of 2 bits and includes a HARQ process number field of 3 bits. Or, the DCI format of the PDCCH or the ePDCCH is a new format, that is, the DCI in the new format does not include a DL DAI field of 2 bits and includes a HARQ process number field of 4 bits. Or, the DCI format of the PDCCH or the ePDCCH is a new format, that is, the DCI in the new format includes a DL DAI field of 2 bits and a HARQ process number field of 4 bits. The UE blind detects the PDCCH scrambled by the C-RNTI of the UE in the common search space on the PDCCH in the downlink subframes $m_0$, $m_1 \ldots m_{M-1}$. The DCI format of the PDCCH is an FDD format, that is, the DCI in the FDD format does not include a DL DAI field and includes a HARQ process number field of 3 bits.

According to the above HARQ-ACK timing, the HARQ-ACKs of the downlink subframes $m_0$, $m_1 \ldots m_{M-1}$ are transmitted on the uplink subframe n and the bundling window size M is larger than 1, the UE blind detects the PDCCH or the ePDCCH scrambled by the C-RNTI of the UE in the UE specific search space on the PDCCH or the ePDCCH in the downlink subframes $m_0$, $m_1 \ldots m_{M-1}$. The DCI format of the PDCCH or the ePDCCH is a modification format, that is, the DCI in the modification format includes a DL DAI field of 2 bits and a HARQ process number field of 4 bits. The UE does not blind detect the PDCCH scrambled by the C-RNTI of the UE in the common search space on the PDCCH in the downlink subframes $m_0$, $m_1 \ldots m_{M-1}$.

A fifth processing method is described as follows.

For an FDD serving cell in which a D2D subframe is configured, according to FDD HARQ-ACK timing, when the HARQ-ACK of the downlink subframe B is to be transmitted on the uplink subframe A and the uplink subframe A is not configured as the D2D subframe, the HARQ-ACK of the downlink subframe B is transmitted on the uplink subframe A. According to the FDD HARQ-ACK timing, when the HARQ-ACK of the downlink subframe B1 is to be transmitted on the uplink subframe A1 and the uplink subframe A1 is configured as the D2D subframe, the HARQ-ACK of the downlink subframe B1 is transmitted on an uplink subframe A2 following the uplink subframe A1, wherein the uplink subframe A2 is the first uplink subframe that is not configured as the D2D subframe.

According to the above HARQ-ACK timing, the HARQ-ACKs of the downlink subframes $m_0$, $m_1 \ldots m_{M-1}$, are transmitted on the uplink subframe n and the bundling window size M is equal to 1, the UE blind detects the PDCCH or the ePDCCH scrambled by the C-RNTI of the UE in the UE specific search space on the PDCCH or the ePDCCH in the downlink subframes $m_0$, $m_1 \ldots m_{M-1}$. The DCI format of the PDCCH or the ePDCCH is an FDD format, that is, the DCI in the FDD format does not include a DL DAI field of 2 bits and includes a HARQ process number field of 3 bits. Or, the DCI format of the PDCCH or the ePDCCH is a new format, that is, the DCI in the new format does not include a DL DAI field of 2 bits and includes a HARQ process number field of 4 bits. Or, the DCI format of the PDCCH or the ePDCCH is a new format, that is, the DCI in the new format includes a DL DAI field of 2 bits and a HARQ process number field of 4 bits.

According to the above HARQ-ACK timing, the HARQ-ACKs of the downlink subframes $m_0$, $m_1 \ldots m_{M-1}$ are transmitted on the uplink subframe n and the bundling window size M is larger than 1, the UE blind detects the PDCCH or the ePDCCH scrambled by the C-RNTI of the UE in the UE specific search space on the PDCCH or the ePDCCH in the downlink subframes $m_0$, $m_1 \ldots m_{M-1}$. The DCI format of the PDCCH or the ePDCCH is a modification format, that is, the DCI in the modification format includes a DL DAI field of 2 bits and a HARQ process number field of 4 bits.

For an FDD serving cell in which a D2D subframe is configured, according to FDD HARQ-ACK timing, when the HARQ-ACK of the downlink subframe B is to be transmitted on the uplink subframe A and the uplink subframe A is not configured as the D2D subframe, the HARQ-ACK of the downlink subframe B is transmitted on the uplink subframe A. The UE blind detects the PDCCH scrambled by the C-RNTI of the UE in the common search space on the PDCCH in the downlink subframe B. The DCI format of the PDCCH is an FDD format, that is, the DCI in the FDD format does not include a DL DAI field and includes a HARQ process number field of 3 bits.

For an FDD serving cell in which a D2D subframe is configured, according to FDD HARQ-ACK timing, when the HARQ-ACK of the downlink subframe B1 is to be transmitted on the uplink subframe A1 and the uplink subframe A1 is configured as the D2D subframe, the HARQ- ACK of the downlink subframe B1 is transmitted on an uplink subframe A2 following the uplink subframe A1, wherein the uplink subframe A2 is the first uplink subframe that is not configured as the D2D subframe. The UE does not blind detect a PDSCH scheduled by the PDCCH scrambled by the C-RNTI of the UE in the common search space on the PDCCH in the downlink subframe B1.

A sixth processing method is described as follows.

For an FDD serving cell in which a D2D subframe is configured, when the downlink subframes $m_0, m_1 \ldots m_{M-1}$ are to transmit HARQ-ACKs according to new HARQ-ACK timing, the UE blind detects the PDCCH or the ePDCCH scrambled by the C-RNTI of the UE in the UE specific search space on the PDCCH or the ePDCCH in the downlink subframes $m_0, m_1 \ldots m_{M-1}$. The DCI format of the PDCCH or the ePDCCH is a modification format, that is, the DCI in the modification format includes a DL DAI field and a HARQ process number field of 4 bits. The UE blind detects the PDCCH scrambled by the C-RNTI of the UE in the common search space on the PDCCH in the downlink subframes $m_0, m_1 \ldots m_{M-1}$, and the DCI format of the PDCCH is an FDD format, that is, the DCI in the FDD format does not include a DL DAI field and includes a HARQ process number field of 3 bits. In this way, it can be ensured that the common search space on the PDCCH is backward compatible. In an embodiment of the present disclosure, a following method for transmitting HARQ-ACK is described.

When the UE configures a PUCCH format 3 HARQ-ACK transmission mode, arranging bits of HARQ-ACKs of downlink subframes in the same bundling window of each serving cell according to a sequence subframes.

When the UE configures a serving cell, supporting a TDD HARQ-ACK multiplexing transmission mode and the PUCCH format 3 HARQ-ACK transmission mode, and not supporting a TDD HARQ-ACK bundling transmission mode.

When the UE configures more than one serving cell, supporting the PUCCH format 3 HARQ-ACK transmission mode, and not supporting a PUCCH format 1b HARQ-ACK transmission mode with channel selection.

For a TDD serving cell, following methods are adopted.

For a TDD serving cell in which a D2D subframe is configured, the UE blind detects a PDCCH or an ePDCCH in a UE specific search space on the PDCCH or the ePDCCH in a downlink subframe and in a common search space on the PDCCH in the downlink subframe. The DCI format of the PDCCH or the ePDCCH is a TDD format, that is, the DCI in the TDD format includes a DL DAI field and a HARQ process number field of 4 bits.

In this way, the HARQ-ACK of downlink data in the cellular network and the D2D communication are not interfered with each other, and thus can be transmitted in time.

A second embodiment is described hereinafter.

When some subframes of an uplink carrier in an FDD serving cell configured by the UE are used as downlink subframes or D2D subframes, a method for transmitting HARQ-ACK is described as follows. For example, through high layer configuration or a dynamical indication, subframes of the uplink carrier are changed into downlink subframes or D2D subframes.

For an FDD serving cell, according to FDD HARQ-ACK timing, when the HARQ-ACK of a downlink subframe n is to be transmitted on an uplink subframe n+4 and the uplink subframe n+4 is not changed into a downlink subframe or a D2D subframe, the HARQ-ACK of the downlink subframe n is transmitted on the uplink subframe n+4. According to the FDD HARQ-ACK timing, when the HARQ-ACK of a downlink subframe n1 is to be transmitted on an uplink subframe n1+4 and the uplink subframe n1+4 is changed into a downlink subframe or a D2D subframe, the HARQ-ACK of the downlink subframe n1 is not transmitted on the uplink subframe n1+4. New HARQ-ACK timing is adopted, for example, the HARQ-ACK of the downlink subframe n1 is transmitted on an uplink subframe B following the uplink subframe n1+4, wherein the uplink subframe B is the first uplink subframe that is not changed into a downlink subframe or a D2D subframe, as shown in FIG. 5. Or, for the FDD serving cell, when some uplink subframes are used as downlink subframes or D2D subframes, reference downlink HARQ-ACK timing is configured through high layer signaling, for example, the reference downlink HARQ-ACK timing includes any one of TDD uplink and downlink configurations 0,1,2,3,4,5,6.

For the FDD serving cell, according to the new HARQ-ACK timing, the number of downlink subframes for transmitting HARQ-ACK on the same uplink subframe is called HARQ-ACK bundling window size.

For the FDD serving cell, there are following processing methods for determining the DCI format.

A first processing method is described as follows.

For an FDD serving cell in which some uplink subframes are changed into downlink subframes or D2D subframes, according to FDD HARQ-ACK timing or reference downlink HARQ-ACK timing configured through high layer signaling, when the HARQ-ACK of a downlink subframe n of a downlink carrier is to be transmitted on an uplink subframe n+4 and the uplink subframe n+4 is not changed into a downlink subframe or a D2D subframe, the UE blind detects a PDCCH or an ePDCCH scrambled by a C-RNTI of the UE in a UE specific search space on the PDCCH or the ePDCCH in the downlink subframe n of the downlink carrier. The DCI format of the PDCCH or the ePDCCH is a TDD format, that is, the DCI in the TDD format includes a DL DAI field of 2 bits and a HARQ process number field of 4 bits. Or, the DCI format of the PDCCH or the ePDCCH is an FDD format, that is, the DCI in the FDD format does not include a DL DAI field and includes a HARQ process number field of 3 bits. The UE blind detects the PDCCH scrambled by the C-RNTI of the UE in a common search space on the PDCCH in the downlink subframe n of the downlink carrier. The DCI format of the PDCCH is an FDD format, that is, the DCI in the FDD format does not include a DL DAI field and includes a HARQ process number field of 3 bits, as shown in FIG. 5.

For an FDD serving cell in which some uplink subframes are changed into downlink subframes or D2D subframes, according to FDD HARQ-ACK timing or reference downlink HARQ-ACK timing configured through high layer signaling, when the HARQ-ACK of a downlink subframe n1 of the downlink carrier is to be transmitted on an uplink subframe n+4 and the uplink subframe n1+4 is changed into a downlink subframe or a D2D subframe, the HARQ-ACK of the downlink subframe n1 of the downlink carrier is transmitted on an uplink subframe n1+k determined according to the new HARQ-ACK timing, wherein k is a positive integer larger than 4 and the value of k is determined according to the new HARQ-ACK timing, and the UE blind detects the PDCCH or the ePDCCH scrambled by the C-RNTI of the UE in a UE specific search space on the PDCCH or the ePDCCH in the downlink subframe n1 of the downlink carrier. The DCI format of the PDCCH or the ePDCCH is a TDD format, that is, the DCI in the TDD format includes a DL DAI field of 2 bits and a HARQ process number field of 4 bits. The UE does not blind detect a PDSCH scheduled by the PDCCH scrambled by the C-RNTI of the UE in a common search space on the PDCCH in the downlink subframe n1 of the downlink carrier, as shown in FIG. 5.

In a HARQ-ACK bundling window, when the UE detects a PDCCH or an ePDCCH only in the UE specific search space on the PDCCH or the ePDCCH, the UE transmits the HARQ-ACK according to a TDD HARQ-ACK transmission mode. In the HARQ-ACK bundling window, when the UE detects the PDCCH in the common search space on the PDCCH, the UE transmits, according to an FDD HARQ-ACK transmission mode, the HARQ-ACK of a PDSCH scheduled by the PDCCH detected in the common search space on the PDCCH.

A second processing method is described as follows.

For an FDD serving cell in which some uplink subframes are changed into downlink subframes or D2D subframes, according to FDD HARQ-ACK timing or reference downlink HARQ-ACK timing configured through high layer signaling, when the HARQ-ACK of the downlink subframe n of the downlink carrier is to be transmitted on the uplink subframe n+4 and the uplink subframe n+4 is not changed into a downlink subframe or a D2D subframe, the HARQ-ACK of the downlink subframe n of the downlink carrier is transmitted on the uplink subframe n+4. According to the FDD HARQ-ACK timing or the reference downlink HARQ-ACK timing configured through high layer signaling, when the HARQ-ACK of the downlink subframe n1 of the downlink carrier is to be transmitted on the uplink subframe n1+4 and the uplink subframe n1+4 is changed into a downlink subframe or a D2D subframe, the HARQ-ACK of the downlink subframe n1 of the downlink carrier is transmitted on an uplink subframe n1+k determined according to the new HARQ-ACK timing, wherein k is a positive integer larger than 4 and the value of k is determined according to the new HARQ-ACK timing, as shown in FIG. 5.

According to the above HARQ-ACK timing, the HARQ-ACKs of downlink subframes $m_0, m_1 \ldots m_{M-1}$ of the downlink carrier are transmitted on the uplink subframe n and the bundling window size M is equal to 1, the UE blind detects the PDCCH or ePDCCH scrambled by the C-RNTI of the UE in a UE specific search space on the PDCCH or the ePDCCH in the downlink subframes $m_0, m_1 \ldots m_{M-1}$ of the downlink carrier. The DCI format of the PDCCH or the ePDCCH is a TDD format, that is, the DCI in the TDD format includes a DL DAI field of 2 bits and a HARQ process number field of 4 bits. Or, the DCI format of the PDCCH or the ePDCCH is an FDD format, that is, the DCI in the FDD format does not include a DL DAI field of 2 bits and includes a HARQ process number field of 3 bits. The UE blind detects the PDCCH scrambled by the C-RNTI of the UE in a common search space on the PDCCH in the downlink subframes $m_0, m_1 \ldots m_{M-1}$ of the downlink carrier. The DCI format of the PDCCH is an FDD format, that is, the DCI in the FDD format does not include a DL DAI field and includes a HARQ process number field of 3 bits.

According to the above HARQ-ACK timing, the HARQ-ACKs of the downlink subframes $m_0, m_1 \ldots m_{M-1}$ of the downlink carrier are transmitted on the uplink subframe n and the bundling window size M is larger than 1, the UE blind detects the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier. The DCI format of the PDCCH or ePDCCH is a TDD format, that is, the DCI in the TDD format includes a DL DAI field of 2 bits and a HARQ process number field of 4 bits. The UE does not blind detect the PDCCH scrambled by the C-RNTI of the UE in the common search space on the PDCCH in the downlink subframes $m_0, m_1 \ldots m_{M-1}$ of the downlink carrier.

A third processing method is described as follows.

For an FDD serving cell in which some uplink subframes are changed into downlink subframes or D2D subframes, according to FDD HARQ-ACK timing or reference downlink HARQ-ACK timing configured through high layer signaling, when the HARQ-ACK of the downlink subframe n of the downlink carrier is to be transmitted on the uplink subframe n+4 and the uplink subframe n+4 is not changed into a downlink subframe or a D2D subframe, the HARQ-ACK of the downlink subframe n of the downlink carrier is transmitted on the uplink subframe n+4. According to the FDD HARQ-ACK timing or the reference downlink HARQ-ACK timing configured through high layer signaling, when the HARQ-ACK of the downlink subframe n1 of the downlink carrier is to be transmitted on the uplink subframe n1+4 and the uplink subframe n1+4 is changed into a downlink subframe or a D2D subframe, the HARQ-ACK of the downlink subframe n1 of the downlink carrier is transmitted on an uplink subframe n1+k determined according to the new HARQ-ACK timing, wherein k is a positive integer larger than 4 and the value of k is determined according to the new HARQ-ACK timing.

The UE blind detects the PDSCH scheduled by the PDCCH scrambled by the C-RNTI of the UE in the common search space on the PDCCH in the downlink subframe n of the downlink carrier. The UE does not blind detect the PDSCH scheduled by the PDCCH scrambled by the C-RNTI of the UE in the common search space on the PDCCH in the downlink subframe n1 of the downlink carrier, as shown in FIG. 5.

According to the above HARQ-ACK timing, when the HARQ-ACKs of the downlink subframes $m_0, m_1 \ldots m_{M-1}$ of the downlink carrier are transmitted on the uplink subframe n and the bundling window size M is equal to 1, the UE blind detects the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier. The DCI format of the PDCCH or the ePDCCH is an FDD format, that is, the DCI in the FDD format does not include a DL DAI field and includes a HARQ process number field of 3 bits. The UE blind detects the PDCCH scrambled by the C-RNTI of the UE in the common search space on the PDCCH in the downlink subframes $m_0, m_1 \ldots m_{M-1}$ of the downlink carrier. The DCI format of the PDCCH is an FDD format, that is, the DCI in the FDD format does not include a DL DAI field and includes a HARQ process number field of 3 bits.

According to the above HARQ-ACK timing, when the HARQ-ACKs of the downlink subframes $m_0, m_1 \ldots m_{M-1}$ of the downlink carrier are transmitted on the uplink subframe n and the bundling window size M is larger than 1, the UE blind detects the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier. The DCI format of the PDCCH or the ePDCCH is a TDD format, that is, the DCI in the TDD format includes a DL DAI field of 2 bits and a HARQ process number field of 4 bits.

In a HARQ-ACK bundling window, when the UE detects a PDCCH or an ePDCCH only in the UE specific search space on the PDCCH or the ePDCCH, the UE transmits the HARQ-ACK according to a TDD HARQ-ACK transmission mode. In the HARQ-ACK bundling window, when the UE detects the PDCCH in the common search space on the PDCCH, the UE transmits, according to an FDD HARQ-ACK transmission mode, the HARQ-ACK of a PDSCH scheduled by the PDCCH detected in the common search space on the PDCCH.

A third embodiment is described as follows.

For an uplink subframe configured as a D2D subframe, a certain UE needs to transmit a D2D channel or signal on the uplink subframe, but other UEs need to transmit cellular channels or signals on the uplink subframe, for example, transmits HARQ-ACKs through a PUCCH. For the uplink subframe configured as the D2D subframe, since the transmitted D2D channel and the PUCCH channel for transmitting the HARQ-ACKs are not aligned in the form of time, and thus the D2D channel may cause serious interference.

For an uplink subframe not configured as a D2D subframe, the UE does not transmit a D2D channel or signal on the uplink subframe, but transmit a cellular channel or signal on the uplink subframe, for example, transmits the HARQ-ACK through a PUCCH. Since the cellular channel is an uplink synchronization channel, other channels in a cell and the PUCCH for transmitting the HARQ-ACK are aligned in the form of time, and thus the interference caused by other channels is smaller than the interference caused by the D2D channel.

Power control used for a PUCCH for transmitting HARQ-ACK on an uplink subframe configured as a D2D subframe is different from power control used for a PUCCH for transmitting HARQ-ACK on an uplink subframe not configured as a D2D subframe. Hereinafter, the PUCCH for transmitting HARQ-ACK and the uplink subframe configured as the D2D subframe are called an uplink subframe set 1, and the PUCCH for transmitting HARQ-ACK and the uplink subframe not configured as the D2D subframe are called an uplink subframe set 2.

The transmission power of PUCCH of subframe i is determined by a following formula:

The transmission power of PUCCH of subframe i is determined by a following formula:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}[dBm].$$

$P_{CMAX}$ is the maximum transmission power of the UE, and is configured by high layer signaling.

Parameter $\Delta_{F\_PUCCH}(F)$ is configured by high layer signaling, and is related to the transmission format of PUCCH.

Parameter h(n) is related to the transmission format of PUCCH, $n_{CQI}$ is the number of bits of transmitted Channel Quality Indicator (CQI) information, and $n_{HARQ}$ is the number of bits of HARQ.

$P_{0\_PUCCH}$ is a sum of specific parameter $P_{O\_NOMINAL\_PUCCH}$ of cell configured by high layer signaling and specific parameter $P_{O\_UE\_PUCCH}$ of UE configured by high layer signaling.

$\delta_{PUCCH}$ is a specific power adjustment value of UE.

$$g(i) = g(i-1) + \sum_{m=0}^{M-1} \delta_{PUCCH}(i - k_m)$$

g(i) is a power adjustment value of current PUCCH.

Initial g(i) is defined as:
If $P_{O\_UE\_PUCCH}$ is reconfigured by a high layer,
g(i)=0
otherwise
$g(0)=\Delta P_{rampup}+\delta_{msg2}$ $\delta_{msg2}$ is a power control command indication value in a random access response.

$\Delta P_{rampup}$ a total power climb value from power configured for the first prefix by high layer signaling to power configured for the last prefix by the high layer signaling.

g(i)=g(i−1), if the subframe i is not an uplink subframe, the transmission format of HARQ-ACK used by the uplink subframe set 1 and the uplink subframe set 2 is configured by high layer signaling, or the uplink subframe set 1 and the uplink subframe set 2 use the same transmission format configured by high layer signaling.

Parameters $P_{O\_NOMINAL\_PUCCH}$ of the uplink subframe set 1 and the uplink subframe set 2 are configured by high layer signaling respectively, or the uplink subframe set 1 and the uplink subframe set 2 use the same value configured by high layer signaling.

Parameters $P_{O\_UE\_PUCCH}$ of the uplink subframe set 1 and the uplink subframe set 2 are configured by high layer signaling respectively, or the uplink subframe set 1 and the uplink subframe set 2 use the same value configured by high layer signaling.

Parameters g(i) of the uplink subframe set 1 and the uplink subframe set 2 are calculated respectively, that is, the calculation of g(i) is performed only for the uplink subframe set 1 or the calculation of g(i) is performed only for the uplink subframe set 2.

According to the above method, an embodiment of the present disclosure also provides a UE, as shown in FIG. 6. The UE may be applied to transmit HARQ-ACK in a LTE system, and includes a receiving module and a HARQ-ACK transmission module.

The receiving module is configured to receive information from an eNB, and determine the assignment of uplink subframes in a cell.

The HARQ-ACK transmission module is configured to determine the transmission of HARQ-ACK according to the assignment of uplink subframes in the cell.

The foregoing is only embodiments of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method for transmitting Hybrid Automatic Repeat reQuest-Acknowledge (HARQ-ACK) in a Long Term Evolution (LTE) system, comprising:
receiving, by a User Equipment (UE) from an evolved Node B (eNB), information including an assignment of uplink subframes in a cell;
receiving, by the UE from the eNB, high layer signaling comprising a first parameter set used in a first uplink subframe set that is configured as a Device-to-Device (D2D) subframe and a second parameter set used in a second uplink subframe set that is not configured as a D2D subframe, wherein the first parameter set and the second parameter set comprise different values of power control parameters;
determining, by the UE, a transmission of HARQ-ACK according to the assignment of uplink subframes in the cell;

determining, by the UE, a first transmission power of a PUCCH for transmitting the HARQ-ACK on a first uplink subframe included in the first uplink subframe set;

transmitting, by the UE, the HARQ-ACK on the first uplink subframe in the first uplink subframe set by using the first transmission power;

determining, by the UE, a second transmission power of the PUCCH for transmitting the HARQ-ACK on a second uplink subframe included in the second uplink subframe set; and transmitting, by the UE, the HARQ-ACK on an uplink subframe in the second uplink subframe set by using the second transmission power.

2. The method of claim 1, wherein the assignment of uplink subframes comprises an assignment of subframes of a Frequency Division Duplexing (FDD) uplink carrier that are configured as Device-to-Device (D2D) subframes and an assignment of Time Division Duplexing (TDD) uplink subframes that are configured as the D2D subframes.

3. The method of claim 2, further comprising: for a subframe n of the FDD uplink carrier that is configured as a D2D subframe or a TDD uplink subframe n that is configured as the D2D subframe, according to FDD or TDD timing, when the UE transmits HARQ-ACKs of downlink subframes $m_0, m_1 \ldots m_{M-1}$ on the subframe n and the UE receives a Physical Downlink Shared Channel (PDSCH) indicated by a Physical Downlink Control Channel (PDCCH) or an enhanced PDCCH (ePDCCH) on at least one of the downlink subframes $m_0, m_1 \ldots m_{M-1}$, receives the PDSCH not indicated by the PDCCH or the ePDCCH, or receives the PDCCH or the ePDCCH indicating Semi-Persistent Scheduling (SPS) release, stopping, by the UE, transmitting and receiving a D2D channel or signal on the subframe n configured as the D2D subframe; and transmitting, by the UE, the HARQ-ACKs on the subframe n configured as the D2D subframe; and when the UE does not receive the PDSCH indicated by the PDCCH or the ePDCCH on at least one of the downlink subframes $m_0, m_1 \ldots m_{M-1}$, does not receive the PDSCH not indicated by the PDCCH or the ePDCCH, and does not receive the PDCCH or the ePDCCH indicating the SPS release, transmitting or receiving, by the UE, the D2D channel or signal on the subframe n configured as the D2D subframe.

4. The method of claim 2, further comprising: for a subframe n of the FDD uplink carrier that is configured as a D2D subframe or a TDD uplink subframe n that is configured as the D2D subframe, according to FDD or TDD timing, when the UE transmits HARQ-ACKs of downlink subframes $m_0, m_1 \ldots m_{M-1}$ on the subframe n and the UE receives a PDSCH indicated by a PDCCH or an ePDCCH on at least one of the downlink subframes $m_0, m_1 \ldots m_{M-1}$, receives the PDSCH not indicated by the PDCCH or the ePDCCH, or receives the PDCCH or the ePDCCH indicating SPS release, deciding, by the UE, according to a result obtained through comparing a priority of a Physical Uplink Control Channel (PUCCH) for transmitting the HARQ-ACKs with a priority of a D2D channel or signal, transmitting the PUCCH on the subframe n configured as the D2D subframe;

transmitting or receiving the D2D channel or signal on the subframe n configured as the D2D subframe; and when the UE does not receive the PDSCH indicated by the PDCCH or the ePDCCH on at least one of the downlink subframes $m_0, m_1 \ldots m_{M-1}$, does not receive the PDSCH not indicated by the PDCCH or the ePDCCH, and does not receive the PDCCH or the ePDCCH indicating SPS release, transmitting or receiving, by the UE, the D2D channel or signal on the subframe n configured as the D2D subframe.

5. The method of claim 4, wherein the UE decides, according to table, to transmit the PUCCH on the subframe n configured as the D2D subframe or to transmit or receive the D2D channel or signal on the subframe n configured as the D2D subframe:

|  | SS | DS | PS CCH | PS DCH | N-PS CCH | N-PS DCH |
|---|---|---|---|---|---|---|
| PUCCH | 1,2 | 1,2 | 1,2 | 1,2 | 1 | 1 | where "1" denotes transmitting the PUCCH and stopping transmitting or receiving the D2D channel or signal, "2" denotes stopping transmitting the PUCCH, and transmitting or receiving the D2D channel or signal, and "1, 2" denotes a scheme denoted by "1" or a scheme denoted by "2".

6. The method of claim 2, further comprising: when an uplink subframe for transmitting HARQ-ACK of a downlink subframe is not configured as a D2D subframe, transmitting the HARQ-ACK of the downlink subframe on the uplink subframe according to FDD or TDD timing;

when the uplink subframe for transmitting the HARQ-ACK of the downlink subframe is configured as the D2D subframe, not transmitting the HARQ-ACK of the downlink subframe on the uplink subframe; and transmitting the HARQ-ACK of the downlink subframe according to new HARQ-ACK timing, the new HARQ-ACK timing comprising the HARQ-ACK of the downlink subframe on an uplink subframe following the uplink subframe, wherein the uplink subframe following the uplink subframe is a first uplink subframe that is not configured as the D2D subframe.

7. The method of claim 6, for an FDD serving cell in which the D2D subframe is configured, when the new HARQ-ACK timing is adopted, further comprising:

when downlink subframes $m_0, m_1 \ldots m_{M-1}$ are to transmit HARQ-ACKs according to the new HARQ-ACK timing, blind detecting, by the UE, a PDCCH or an ePDCCH scrambled by a Cell-Radio Network Temporary Identifier (C-RNTI) of the UE in a UE specific search space on the PDCCH or the ePDCCH in the downlink subframes $m_0, m_1 \ldots m_{M-1}$; and not blind detecting the PDCCH scrambled by the C-RNTI of the UE in a common search space on the PDCCH in the downlink subframes $m_0, m_1 \ldots m_{M-1}$, wherein a Downlink Control Information (DCI) format of the PDCCH or the PDCCH is a modification format, the DCI in the modification format comprising a Downlink (DL) Downlink Assign Indication (DAI) field and a HARQ process number field of 4 bits.

8. The method of claim 6, for an FDD serving cell in which the D2D subframe is configured, further comprising:

when the uplink subframe for transmitting the HARQ-ACK of the downlink subframe is not configured as the D2D subframe, blind detecting, by the UE, a PDCCH or an ePDCCH scrambled by a C-RNTI of the UE in a UE specific search space on the PDCCH or the ePDCCH in the downlink subframe wherein a DCI format of the PDCCH or the ePDCCH is a modification format, the DCI in the modification format comprising a DL DAI field of 2 bits and a HARQ process number field of 4 bits;

blind detecting, by the UE, the PDCCH scrambled by the C-RNTI of the UE in a common search space on the PDCCH in the downlink subframe, wherein the DCI format of the PDCCH is an FDD format, the DCI in the FDD format not comprising a DL DAI field and comprises a HARQ process number field of 3 bits; and when the uplink subframe for transmitting the HARQ-ACK of the downlink subframe is configured as the D2D subframe, transmitting the HARQ-ACK of the downlink subframe on an uplink subframe following the uplink subframe, wherein the uplink subframe following the uplink subframe is the first uplink subframe that is not configured as a D2D subframe;

blind detecting, by the UE, the PDCCH or the ePDCCH scrambled by the C-RNTI of the UE in the UE specific search space on the PDCCH or the ePDCCH in the downlink subframe, wherein the DCI format of the PDCCH or the ePDCCH is a modification format, the DCI in the modification format comprising a DL DAI field of 2 bits and a HARQ process number field of 4 bits; and not blind detecting, by the UE, a PDSCH scheduled by the PDCCH scrambled by the C-RNTI of the UE in the common search space on the PDCCH in the downlink subframe.

9. The method of claim 6, for an FDD serving cell in which a D2D subframe is configured, further comprising:

when HARQ-ACKs of downlink subframes $m_0$, $m_1$ ... $m_{M-1}$ are transmitted on an uplink subframe n and the bundling window size M of the uplink subframe n is equal to 1, blind detecting, by the UE, the PDCCH or the ePDCCH scrambled by a C-RNTI of the UE in a UE specific search space on the PDCCH or the ePDCCH in the downlink subframes $m_0$, $m_1$ ... $m_{M-1}$, wherein the DCI format of the PDCCH or the ePDCCH is a modification format, the DCI in the modification format comprising a DL DAI field of 2 bits, into which zero is filled, and comprising a HARQ process number field of 4 bits;

blind detecting, by the UE, the PDCCH scrambled by the C-RNTI of the UE in a common search space on the PDCCH in the downlink subframes $m_0$, $m_1$ ... $m_{M-1}$, wherein the DCI format of the PDCCH is an FDD format, the DCI in the FDD format not comprising a DL DAI field and comprising a HARQ process number field of 3 bits;

when the HARQ-ACKs of the downlink subframes $m_0$, $m_1$ ... $m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0$, $m_1$ ... $m_{M-1}$, wherein the DCI format of the PDCCH or the ePDCCH is a modification format, the DCI in the modification format comprising a DL DAI field of 2 bits and a HARQ process number field of 4 bits; and not blind detecting, by the UE, a PDSCH scheduled by the PDCCH scrambled by the C-RNTI of the UE in the common search space on the PDCCH in the downlink subframes $m_0$, $m_1$ ... $m_{M-1}$.

10. The method of claim 6, for an FDD serving cell in which a D2D subframe is configured, further comprising:

when HARQ-ACKs of downlink subframes $m_0$, $m_1$ ... $m_{M-1}$ are transmitted on an uplink subframe n and the bundling window size M of the uplink subframe n is equal to 1, blind detecting, by the UE, the PDCCH or the ePDCCH scrambled by a C-RNTI of the UE in a UE specific search space on the PDCCH or the ePDCCH in the downlink subframes $m_0$, $m_1$ ... $m_{M-1}$, wherein at least one of:

the DCI format of the PDCCH or the ePDCCH is an FDD format, the DCI in the FDD format not comprising a DL DAI field of 2 bits and comprising a HARQ process number field of 3 bits;

the DCI format of the PDCCH or the ePDCCH is a new format, the DCI in the new format not comprising a DL DAI field of 2 bits and comprising a HARQ process number field of 4 bits; or the DCI format of the PDCCH or the ePDCCH is a new format, and DCI in the new format comprises a DL DAI field of 2 bits and a HARQ process number field of 4 bits;

blind detecting, by the UE, the PDCCH scrambled by the C-RNTI of the UE in a common search space on the PDCCH in the downlink subframes $m_0$, $m_1$ ... $m_{M-1}$, wherein the DCI format of the PDCCH is an FDD format, the DCI in the FDD format not comprising a DL DAI filed and comprising a HARQ process number field of 3 bits;

when the HARQ-ACKs of the downlink subframes $m_0$, $m_1$ ... $m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0$, $m_1$ ... $m_{M-1}$, wherein the DCI format of the PDCCH or the ePDCCH is a modification format, the DCI in the modification format comprising a DL DAI field of 2 bits and a HARQ process number field of 4 bits; and not blind detecting, by the UE, a PDSCH scheduled by the PDCCH scrambled by the C-RNTI of the UE in the common search space on the PDCCH in the downlink subframes $m_0$, $m_1$ ... $m_{M-1}$.

11. The method of claim 6, for an FDD serving cell in which a D2D subframe is configured, further comprising:

when HARQ-ACKs of downlink subframes $m_0$, $m_1$ ... $m_{M-1}$ are transmitted on an uplink subframe n and the bundling window size M of the uplink subframe n is equal to 1, blind detecting, by the UE, the PDCCH or the ePDCCH scrambled by a C-RNTI of the UE in a UE specific search space on the PDCCH or the ePDCCH in the downlink subframes $m_0$, $m_1$ ... $m_{M-1}$, wherein the DCI format of the PDCCH or the ePDCCH is an FDD format, and wherein at least one of:

the DCI in the FDD format does not comprise a DL DAI field of 2 bits and comprises a HARQ process number field of 3 bits;

the DCI format of the PDCCH or the ePDCCH is a new format, and DCI in the new format does not comprise a DL DAI field of 2 bits and comprises a HARQ process number field of 4 bits; or the DCI format of the PDCCH or the ePDCCH is a new format, and DCI in the new format comprises a DL DAI field of 2 bits and a HARQ process number field of 4 bits;

when the HARQ-ACKs of the downlink subframes $m_0$, $m_1$ ... $m_{M-1}$ are transmitted on the uplink subframe n and the bundling window size M of the uplink subframe n is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$, wherein the DCI format of the PDCCH or the ePDCCH is a modification format, the DCI in the modification format comprising a DL DAI field of 2 bits and a HARQ process number field of 4 bits;

when the uplink subframe for transmitting the HARQ-ACK of the downlink subframe is not configured as the D2D subframe, blind detecting, by the UE, the PDCCH scrambled by the C-RNTI of the UE in a common search space on the PDCCH in the downlink subframe, wherein the DCI format of the PDCCH is an FDD format, the DCI in the FDD format not comprising a DL DAI field and comprising a HARQ process number field of 3 bits; and when the uplink subframe for transmitting the HARQ-ACK of the downlink subframe is configured as the D2D subframe, not blind detecting, by the UE, the PDSCH scheduled by the PDCCH scrambled by the C-RNTI of the UE in the common search space on the PDCCH in the downlink subframe.

12. The method of claim 6, for an FDD serving cell in which a D2D subframe is configured, when new HARQ-ACK timing is adopted, further comprising:

when downlink subframes $m_0, m_1 \ldots m_{M-1}$ transmit HARQ-ACKs according to the new HARQ-ACK timing, blind detecting, by the UE, the PDCCH or the ePDCCH scrambled by a C-RNTI of the UE in a UE specific search space on the PDCCH or the ePDCCH in the downlink subframes $m_0, m_1 \ldots m_{M-1}$, wherein the DCI format of the PDCCH or the ePDCCH is a modification format, the DCI in the modification format comprising a DL DAI field and a HARQ process number field of 4 bits; and blind detecting, by the UE, the PDCCH scrambled by the C-RNTI of the UE in a common search space on the PDCCH in the downlink subframes $m_0, m_1 \ldots m_{M-1}$, wherein the DCI format of the PDCCH is an FDD format, the DCI in the FDD format not comprising a DL DAI field and comprising a HARQ process number field of 3 bits.

13. The method of claim 12, wherein the transmitting the HARQ-ACK comprises:

when the UE configures a PUCCH format 3 HARQ-ACK transmission mode, arranging bits of HARQ-ACKs of downlink subframes in a same bundling window of each serving cell according to a sequence subframes;

when the UE configures a serving cell, supporting a TDD HARQ-ACK multiplexing transmission mode and the PUCCH format 3 HARQ-ACK transmission mode, and not supporting a TDD HARQ-ACK bundling transmission mode; and when the UE configures more than one serving cell, supporting the PUCCH format 3 HARQ-ACK transmission mode, and not supporting a PUCCH format 1b HARQ-ACK transmission mode with channel selection.

14. The method of claim 1, wherein the assignment of uplink subframes comprises the assignment of subframes of an FDD uplink carrier that are changed into downlink subframes or D2D subframes.

15. The method of claim 14, further comprising at least one of:

for an FDD serving cell, according to FDD HARQ-ACK timing or reference downlink HARQ-ACK timing configured through high layer signaling, when an uplink subframe n+4 for transmitting HARQ-ACK of a downlink subframe n of a downlink carrier is not changed into a downlink subframe or a D2D subframe, transmitting the HARQ-ACK of the downlink subframe n of the downlink carrier on the uplink subframe n+4;

when the uplink subframe n+4 for transmitting the HARQ-ACK of the downlink subframe n of the downlink carrier is changed into the downlink subframe, transmitting the HARQ-ACK of the downlink subframe n of the downlink carrier according to new HARQ-ACK timing, the new HARQ-ACK timing comprises transmitting the HARQ-ACK of the downlink subframe n of the downlink carrier on an uplink subframe following the uplink subframe n+4, wherein the uplink subframe following the uplink subframe n+4 is a first uplink subframe that is not changed into a downlink subframe or a D2D subframe; or configuring reference downlink HARQ-ACK timing through high layer signaling, wherein the reference downlink HARQ-ACK timing comprises any one of TDD uplink and downlink configurations 0, 1, 2, 3, 4, 5, 6.

16. The method of claim 15, further comprising:

when an uplink subframe for transmitting HARQ-ACK of a downlink subframe of the downlink carrier is not changed into a downlink subframe or a D2D subframe, blind detecting, by the UE, a PDCCH or an ePDCCH scrambled by a C-RNTI of the UE in a UE specific search space on the PDCCH or the ePDCCH in the downlink subframe of the downlink carrier, wherein at least one of:

a DCI format of the PDCCH or the ePDCCH is a modification format, the DCI in the modification format comprising a DL DAI field of 2 bits and a HARQ process number field of 4 bits; or the DCI format of the PDCCH or the ePDCCH is an FDD format, the DCI in the FDD format not comprising a DL DAI field and comprises a HARQ process number field of 3 bits;

blind detecting, by the UE, the PDCCH scrambled by the C-RNTI of the UE in a common search space on the PDCCH in the downlink subframe of the downlink carrier, wherein the DCI format of the PDCCH is an FDD format, DCI in the FDD format not comprising the DL DAI field and comprising the HARQ process number field of 3 bits;

when the uplink subframe for transmitting the HARQ-ACK of the downlink subframe of the downlink carrier is changed into the downlink subframe or the D2D subframe, blind detecting, by the UE, the PDCCH or the ePDCCH scrambled by the C-RNTI of the UE in the UE specific search space on the PDCCH or the ePDCCH in the downlink subframe of the downlink carrier, wherein the DCI format of the PDCCH or the ePDCCH is a modification format, the DCI in the modification format comprising a DL DAI field of 2 bits and a HARQ process number field of 4 bits;

not blind detecting, by the UE, a PDSCH scheduled by the PDCCH scrambled by the C-RNTI of the UE in the common search space on the PDCCH in the downlink subframe of the downlink carrier;

in a HARQ-ACK bundling window, when the UE detects a PDCCH or an ePDCCH only in the UE specific search space on the PDCCH or the ePDCCH, transmitting, by the UE, the HARQ-ACK according to a TDD HARQ-ACK transmission mode; and in the HARQ-ACK bundling window, when the UE detects the PDCCH in the common search space on the PDCCH, transmitting, by the UE according to an FDD HARQ-ACK transmission mode, HARQ-ACK of a PDSCH scheduled by the PDCCH detected in the common search space on the PDCCH.

17. The method of claim 15, further comprising:
when HARQ-ACKs of downlink subframes $m_0, m_1 \ldots m_{M-1}$ of the downlink carrier are transmitted in a bundling window and the bundling window size M of the bundling window is equal to 1, blind detecting, by the UE, a PDCCH or an ePDCCH scrambled by a C-RNTI of the UE in a UE specific search space on the PDCCH or the ePDCCH in the downlink subframes $m_0, m_1 \ldots m_{M-1}$ of the downlink carrier,
wherein at least one of:
a DCI format of the PDCCH or the ePDCCH is a modification format, the DCI in the modification format comprising a DL DAI field of 2 bits and a HARQ process number field of 4 bits; or
the DCI format of the PDCCH or the ePDCCH is an FDD format, the DCI in the FDD format not comprising a DL DAI field and comprising a HARQ process number field of 3 bits;
blind detecting, by the UE, the PDCCH scrambled by the C-RNTI of the UE in a common search space on the PDCCH in the downlink subframes $m_0, m_1 \ldots m_{M-1}$ of the downlink carrier, wherein the DCI format of the PDCCH is an FDD format, the DCI in the FDD format not comprising a DL DAI field and comprising a HARQ process number field of 3 bits;
when the HARQ-ACKs of the downlink subframes $m_0, m_1 \ldots m_{M-1}$ of the downlink carrier are transmitted in the bundling window and the bundling window size M of the bundling window is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier, wherein the DCI format of the PDCCH or the ePDCCH is a modification format, the DCI in the modification format comprising a DL DAI field of 2 bits and a HARQ process number field of 4 bits; and
not blind detecting, by the UE, a PDSCH scheduled by the PDCCH scrambled by the C-RNTI of the UE in the common search space on the PDCCH in the downlink subframes $m_0, m_1 \ldots m_{M-1}$ of the downlink carrier.

18. The method of claim 15, further comprising:
blind detecting, by the UE, a PDSCH scheduled by a PDCCH scrambled by a C-RNTI of the UE in a common search space on the PDCCH in a downlink subframe n of the downlink carrier; and not blind detecting, by the UE, the PDSCH scheduled by the PDCCH scrambled by the C-RNTI of the UE in a common search space on the PDCCH in a downlink subframe for transmitting the HARQ-ACK according to new HARQ-ACK timing;
when HARQ-ACKs of downlink subframes $m_0, m_1 \ldots m_{M-1}$ of the downlink carrier are transmitted in a bundling window and the bundling window size M of the bundling window is equal to 1, blind detecting, by the UE, the PDCCH or the ePDCCH scrambled by the C-RNTI of the UE in a UE specific search space on the PDCCH or the ePDCCH in the downlink subframes $m_0, m_1 \ldots m_{M-1}$ of the downlink carrier, wherein the DCI format of the PDCCH or the ePDCCH is an FDD format, the DCI in the FDD format not comprising a DL DAI field and comprising a HARQ process number field of 3 bits;
blind detecting, by the UE, the PDCCH scrambled by the C-RNTI of the UE in the common search space on the PDCCH in the downlink subframes $m_0, m_1 \ldots m_{M-1}$ of the downlink carrier, wherein the DCI format of the PDCCH is an FDD format, the DCI in the FDD format not comprising a DL DAI field and comprising a HARQ process number field of 3 bits;
when the HARQ-ACKs of the downlink subframes $m_0, m_1 \ldots m_{M-1}$ of the downlink carrier are transmitted in the bundling window and the bundling window size M of the bundling window is larger than 1, blind detecting, by the UE, the PDCCH or the ePDCCH scrambled by the C-RNTI of the UE in the UE specific search space on the PDCCH or the ePDCCH in the downlink subframes $m_0, m_1 \ldots m_{M-1}$ of the downlink carrier, wherein the DCI format of the PDCCH or the ePDCCH is a TDD format, the DCI in the TDD format comprising a DL DAI field of 2 bits and a HARQ process number field of 4 bits;
in a HARQ-ACK bundling window, when the UE detects a PDCCH or an ePDCCH only in the UE specific search space on the PDCCH or the ePDCCH, transmitting, by the UE, the HARQ-ACK according to a TDD HARQ-ACK transmission mode; and
in the HARQ-ACK bundling window, when the UE detects the PDCCH in the common search space on the PDCCH, transmitting, by the UE according to an FDD HARQ-ACK transmission mode, HARQ-ACK of a PDSCH scheduled by the PDCCH detected in the common search space on the PDCCH.

19. A User Equipment (UE), comprising:
a receiving circuit; and
a Hybrid Automatic Repeat reQuest-Acknowledge (HARQ-ACK) transmission circuit, wherein the receiving circuit is configured to:
receive information including an assignment of uplink subframes in a cell, from an evolved Node B (eNB),
receive, from the eNB, high layer signaling comprising a first parameter set used in a first uplink subframe set that is configured as a Device-to-Device (D2D) subframe and a second parameter set used in a second uplink subframe set that is not configured as a D2D subframe, wherein the first parameter set and the second parameter set comprise different values of power control parameters, and
wherein the HARQ-ACK transmission circuit is configured to:
determine a transmission of HARQ-ACK according to the assignment of uplink subframes in the cell,
determine a first transmission power of a PUCCH for transmitting the HARQ-ACK on a first uplink subframe included in the first uplink subframe set,
transmit the HARQ-ACK on the first uplink subframe in the first uplink subframe set by using the first transmission power,
determine a second transmission power of the PUCCH for transmitting the HARQ-ACK on a second uplink subframe included in the second uplink subframe set, and
transmit the HARQ-ACK on an uplink subframe in the second uplink subframe set by using the second transmission power.

\* \* \* \* \*